United States Patent [19]
Kubie

[11] 3,873,326
[45] Mar. 25, 1975

[54] CONCRETE-CURING AND ANTISPALLING COMPOSITIONS

[75] Inventor: William L. Kubie, Peoria, Ill.

[73] Assignee: The United States of America as represented by the Secretary of Agriculture, Washington, D.C.

[22] Filed: June 1, 1973

[21] Appl. No.: 365,900

Related U.S. Application Data

[63] Continuation-in-part of Ser. No. 183,652, Sept. 24, 1971, abandoned.

[30] Foreign Application Priority Data
Aug. 18, 1972 Canada................................ 149738

[52] U.S. Cl.................... 106/12, 106/250, 106/252, 106/263, 117/123 C
[51] Int. Cl. ........................... C08h 9/00, C09k 3/00
[58] Field of Search ......... 106/12, 250, 25, 21, 263; 117/123 C

[56] References Cited
UNITED STATES PATENTS
3,228,777  1/1966  Kubie.................................. 106/12

OTHER PUBLICATIONS

Eastman, "The History of the Linseed Oil Industry in the United States," T. S. Dennison & Co., Minneapolis, 1968, p. 163.
Cargill, Cargill Vegetable Oils," Form VGA-124 (Rev. 11/70).

*Primary Examiner*—Allan Lieberman
*Attorney, Agent, or Firm*—M. Howard Silverstein; Max D. Hensley; David G. McConnell

[57] ABSTRACT

Oil-in-water emulsions are disclosed which exhibit significant improvements in concrete-curing and antispalling properties. This is accomplished by emulsifying mixtures of heat-bodied LSO or conjugated oils such as tung oil and boiled linseed oils.

9 Claims, No Drawings

CONCRETE-CURING AND ANTISPALLING COMPOSITIONS

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This is a continuation-in-part of application Ser. No. 183,652 filed Sept. 24, 1971 now abandoned.

This invention relates to improved concrete-curing compositions that also acts as effective agents.

More specifically, the invention relates to an improved, stable oil-in-water emulsion which, when sprayed on freshly poured concrete, forms a continuous film that retards evaporation of water required for internal hydration and which, when sprayed on cured concrete, penetrates the surface of the concrete forming a barrier to water and salt and thus preventing excessive spalling (i.e., localized crumbling of the concrete accompanied by the ejection of superficially located pebbles or small stones).

Discussions of prior art concerning concrete-cure and antispalling compositions can be found in U.S. Pat. No. 3,228,777 and "Linseed Oil Emulsions for Protecting Concrete," J. Amer. Oil Chem. Soc. 44(3): 194-196 (1967), both of which are herein incorporated as references. The objects of the instant invention are also the same objects stated in U.S. Pat. No. 3,288,777 (supra) which are herein incorporated by reference.

In accordance with the invention, I have prepared improved dual-purpose concrete-cure and antispalling compositions of the aqueous emulsion type which normally contain a boiled linseed oil (LSO) oil phase, emulsifiers, and stabilizers. The improvement comprises an oil phase containing 50 to 90 volume percent boiled LSO and from 10 to 50 volume percent of a composition selected from the group consisting of heat-bodied LSO, tung oil, and mixture of the same. This dual-purpose concrete-cure and antispalling composition can be in the form of a ready-to-apply aqueous emulsion or a water-extendable nonaqueous solution which can be readily emulsified in water prior to application. The emulsions must remain stable for extended periods of storage and shipping or have the ability to be easily re-emulsified. Compositions prepared according to the inventions have been on the laboratory shelf for over 2 years with no degradation of the emulsion and very little discoloration.

Instant compositions containing heat-bodied LSO or tung oil blended with boiled LSO in ratios of between 10/90 to 50/50, when used as curing agents, maintained lower water than similar compositions containing only bodied LSO. These emulsions also have as good or better antispalling properties than emulsions containing boiled LSO alone.

A unique advantage of the instant products is that their curing and antispalling properties can be optimized to account for different conditions and concretes by varying the composition of the oil phase in accordance with the invention.

The advantages disclosed in U.S. Pat. No. 3,228,777 (supra) are herein incorporated as additional advantages of the instant compositions.

DETAILED DESCRIPTION OF THE INVENTION

Heat-bodied LSO's, also known in the trade as polymerized, heat-polymerized, and kettle-bodied LSO's, are herein defined as those LSO's that have been polymerized by heating to temperatures of from about 230° to 330° C. in an inert atomsphere (i.e., an atmosphere in which oxygen has been excluded) (Bailey's Industrial Oil and Fat Products, ed. D. Swern, Interscience Publishers, New York, Third Edition, 1964, pp. 512-514 and 1039-1045). Blown LSO's which are bodied by aerating LSO for several hours at 95° to 120° C. (Bailey's Industrial Oil and Fat Products, supra, pp. 1046-1049) are not considered to be useful in accordance with the invention. Due to their greater quantity of oxygen-containing groups, blown LSO's, bodied as described above, produce less resistant films (see Bailey's Industrial oil and Fat Products, supra, p. 514). Therefore, dual-purpose concrete-curing and antispalling compositions, prepared and used as described for the instant invention, containing blown LSO, impart less durabiblity to concrete than the instant compositions. Blown LSO having a viscosity of Z-3-3/4 was used to make emulsions having blown LSO to boiled LSO ratios of 100/0, 50/50, and 25/75. The visocisty of the 50/50 emulsion at 3 weeks of age was 475 centipoises as compared to 55 centipoises for the 100/0 emulsion. This is an indication that the 50/50 emulsion is beginning to break at 3 weeks of age. At 6 weeks of age, all three of the above emulsions had irreversibly broken. The original emulsions were the normal milky-white color, but by the time the emulsions had broken, a color change had occurred which ranged from yellow to brown. The color change was apparently due to a reaction between the boiled oil and the oxygen groups in the blown oil. Penetration studies indicated that the films produced by emulsions containing blown LSO/boiled LSO oil phases were porous, which is in direct opposition to the teaching that films produced by concrete-cure antispalling compositions should be continuous.

Tung oil is herein defined to include raw, refined, and heat-bodied tung oil. Other conjugated oils such as citicica and dehydrated castor oil are considered to be equivalent to tung oil for the purpose of the invention.

boiled LSO's are herein defined to include LSO which has been heated to permit the incorporation of metallic driers (The History of the Linseed Oil Industry in the United States, ed. W. Eastman, T. S. Denison and Company, Inc., Minneapolis, Minn., 1968, pp. 160—163). Raw and refined LSO's to which soluble driers have been added are also included.

Oil-in-water emulsions used for concrete curing and antispalling usually contain ingredients other than oil and water. These ingredients are necessary to prevent de-emulsification and to stabilize the oil against premature polymerization during storage, transportation, and application. Studies concerned with achieving the desired emulsion stability (i.e., having sufficient stability to remain emulsified until after use, but not so stable that after application it could re-emulsify on contact with water) have resulted in the selection of several stabilizing compounds and their ranges of addition. They are as follows:

Saturated tallow alcohols - 0.5 to 1.5 percent by weight of total emulsion. The minimum amount that will increase stability of emulsions without increasing water sensitivity of the dried oil film is about 0.5 percent. An addition of above 1.5 percent at low temperatures causes the viscosity of the oil phase to increase because of the insolubility of the alcohols.

Dipicolinic acid - 0.005 to 0.015 percent by weight of total emulsion. This material (after being neutralized by the addition of base) assists in the emulsification of the metallic driers usually found in boiled LSO. The optimum amount needed depends on the amounts of metallic driers in the oil and the hardness of the water (see U.S. Pat. No. 3,140,191).

Alkali - 0.1 to 0.3 percent by weight of total emulsion. NaOH is the preferred alkali and gives the best emulsion. Alkali is used to neutralize the dipicolinic acid and any free fatty acids present. The preferred range gives maximum stability with the least re-emulsification in the event of rain.

A 2/1 mixture of 4-methoxy-4-methyl-pentanol-2 and ethylene glycol - (this is used only in the water-extendable nonaqueous solutions) 1 to 2 percent by weight of nonaqueous solution. The addition of this compound promotes the facile emulsification of the nonaqueous solution prior to application.

The preferred procedure is to dissolve the saturated tallow alcohols in the oil to form an oil phase and to dissolve the alkali and dipicolinic acid in water to from a water phase. The oil phase is slowly added to an equal volume of water phase which is being vigorously agitated. The resulting emulsion is then pumped through a blender or homogenizer. A Manton-Gaulin two-stage homogenizer was used for the preparations described in the examples. Water-extendable nonaqueous solutions provide an emulsion stable for about 24 hours when mixed with an equal volume of water with a paddle-type stirrer.

The oil phase to water phase ratio of 1/1 (v/v) is preferred because of its convenience. However, ratios of 55/45 to 45/55 (v/v) of oil phase to water phase give operable emulsions. Higher oil contents tend to form water-in-oil emulsions which have less viscosity stability. At lower oil contents the emulsion is unstable. These ratios give emulsions containing 43–53 percent oil by total weight of emulsion.

Commerically available heat-bodied LSO's used in the examples for the preparation of dual-purposes concrete-cure antispalling compositions in accordance with the invention had Gardner-Holdt (G-H) viscosities in the range of from Z-2 to M-37, acid numbers of from 3 to 22, saponification numbers of from about 187 to 194, and iodine numbers of from 115 to 175. For the sake of simplicity, heat-bodied oils will be herein identified by their viscosity number only. This is not to be construed as a suggestion that the improved curing or antispalling properties exhibited by the instant compositions are visocsity related There appears to be no correlation between the emulsions' stability, concrete-cure, or antispalling properties and the viscosity, acid numbers, saponification numbers, or iodine numbers of the oils in the emulsions. Heat-bodied LSO's having a G-H viscosity of from Z-2 to M-37 are useful for preparing the instant compositions. However, those having G-H viscosities of from Z-5 to M-37 are preferred.

Raw tung oil having a Brookfield viscosity of only 950 centipoises blended with boiled LSO in accordance with the invention produces an emulsion having concrete-cure and antispalling properties equal to those emulsions containing heat-bodied LSO. The data in Table 1 shows the variation in viscosities of oil, oil phases, and emulsions (50 percent by volume water phase) containing different heat-bodied LSO's, blown LSO's, and tung oil.

Table 1

| Oil phase composition | Viscosity, centipoises (Brookfield at 20 r.p.m., 25°C.) | | |
|---|---|---|---|
|  | Oil | Oil+3%TA | Emulsion |
| Boiled LSO | 70 | 70 | 40 |
| Raw tung oil | 950 | ... | 154 |
| Z-2 LSO | 4,890 | 3,910 | 200 |
| Z-4 LSO | 8,380 | 7,170 | 594 |
| Z-5 LSO | 13,720 | 10,260 | 776 |
| Z-8 LSO | ... | 41,350 | 1,460 |
| M-25 LSO | ... | 46,600 | 620 |
| Z-3-3/4 blown LSO | 7,790 | 5,880 | 55 [1] |
| 1:1, Z-3-3/4 blown LSO: boiled LSO | ... | ... | 475 [1] |
| 1:1, Z-2 LSO:boiled LSO | ... | ... | 185 |
| 1:1, Z-4 LSO:boiled LSO | ... | ... | 250 |
| 1:1, Z-5 LSO:boiled LSO | ... | ... | 265 |
| 1:1, M-37 LSO:boiled LSO | ... | 1,400 | ... |
| 1:1, M-37 LSO emulsion: boiled LSO emulsion | ... | ... | 115 |

[1] Emulsions irreversibly unstable.

Surprisingly, the improvements in concrete-cure and antispalling properties do not linearly correspond to the relative amounts of heat-bodied LSO or tung oil present in the oil phase. While ratios of heat-bodied LSO or tung oil to boiled LSO between 10/90 and 50/50 significantly improve the properties, the preferred ratios of from 15/85 to 30/70 for heat-bodied LSO/boiled LSO emulsions and from 10/90 to 25/75 for tung oil/boiled LSO emulsions give optimum performance.

Concrete blocks prepared in such a manner as to simulate bridge decks or highway surfaces were used to test the instant emulsions for concrete-curing and antispalling properties. Curing compositions were tested for their ability to impart minimum water loss to the wet concrete, while antispalling was determined by subjecting treated concrete blocks to severe weather conditions simulated by sequentially freezing and thawing the concrete at 0° F. and 78°F. with a 3 percent salt solution in contact with the surface. Oil penetration was also used as an indication of antispalling properties. Sand and gravel (Illinois aggregate, one-fourth inch maximum). Portland cement, water, and an air entrainment agent were mixed in a ratio of about 3/1/0.5/0.00017 parts by weight. For laboratory curing test polyethylene dishes (4 × 4 × 1½ inches), each containing a stainless-steel wedge (4 ×  inches) in the center, were overfilled slightly with concrete. The wedge produces a weak area along which the block later can easily be broken. As soon as the free water disappears, the excess concrete was screeded off. After about 2 hours, the surface was finished with a wooden block and a stiff brush (1 × 1⅞ inches, angle cut, beveled, hog bristle). The blocks were immediately sprayed with emulsions prepared from oil phases containing from –100 percent heat-bodied LSO's having viscosities of from Z-2 to M-37, raw tung oil, or mixtures of heat-bodied LSO's and tung oil. Application rate was 200 square feet per gallon.

Controls were prepared by curing wet concrete blocks by conventional methods (i.e., polyethylene sheets, commercial curing compositions, or air). During curing indoors at room temperature, water loss was determined for each concrete sample. After curing for 7 days, the blocks were removed from the polyethylene dishes and stored in the laboratory or outdoors.

Significantly lower water losses occurred in each concrete block treated with emulsions prepared from oil phases containing from 10 to 50 percent heat-bodied LSO's than those blocks treated with emulsions prepared from 100 percent boiled LSO. Some of the tests utilizing emulsions prepared from oil mixtures containing more than 50 percent heat-bodied LSO showed acceptable water losses.

Additons of pigment ($TiO_2$) to the emulsions in quantities of up to 5 percent by weight increased water losses somewhat, but the values were not unacceptable.

Emulsions prepared from oil phases containing from 10 to 100 percent tung oil significantly lowered water losses when compared to emulsions prepared from oil phases containing only boiled LSO. However, emulsions containing from 10 to 50 percent tung oil in the oil phase are preferred.

The laboratory water loss test described above are sufficient to show the inventive improvement; however, ASTM standard tests are designed to be more accurate and reproducible. Accordingly, ASTM C156-65 tests were run on emulsions prepared from oil mixtures containing 0, 15, 25, 40, and 100 percent Z-18 oil at application rates of 175 and 200 square feet per gallon. While the emulsion containing only boiled LSO acceptably prevented water loss, in each test run there was an emulsion prepared from an oil mixture whose water loss results were only one-third of those produced by the boiled LSO emulsion. As in the previous tests, each emulsion prepared from oil phases containing from 15 to 40 percent heat-bodied LSO prevented water loss significantly better than the emulsion containing 100 percent boiled LSO or 100 percent heat-bodied LSO.

Acceptable ASTM standard water loss test results were also obtained with emulsions containing 5 percent $TiO_2$ which were prepared from oil phases containing either 50 percent Z-5 LSO, 20 percent Z-8 LSO, or 20 percent tung oil.

All water loss tests were done in duplicate. In some, one of the duplicate blocks was broken and depth of penetration of the curing composition was measured. This was accomplished by spraying the broken edge of the concrete with a 50-percent solution of sulfuric acid and baking the treated block at 130° for 30 minutes. Organic material was thus charred producing a black area where the oil had penetrated. The second duplicate block of the concrete-cure penetration test series was coated on the 31st day after preparation with antispalling composition consisting of 50 percent by volume boiled LSO and 50 percent mineral spirits at a level of 225 square feet per gallon. On the 35th day, the block was broken and the depth of penetration measured. Penetration of the antispalling composition was considered accomplished if the penetration depth was greater on the second duplicate block than on the first (i.e., the ones coated only with concrete-curing composition prepared according to the instant invention). Results of experimentation indicate that curing compositions must penetrate the concrete in order for antispalling compositions to penetrate during their subsequent application. There must be penetration of the oil to achieve effective antispalling, although the necessary amounts are not quantitatively known. Sufficient oil penetration was achieved with curing composition prepared from oil phases containing from 0 to 40 percent Z-8 to M-37 heat-bodied LSO's. These same compositions allowed subsequent penetration by the 50/50 boiled LSO-mineral spirits antispalling compound. Curing compositions containing oil phases comprised of from 59 to 100 percent Z-2LSO, and those comprises of up to 20 percent tung oil, also penetrated the wet concrete and allowed subsequent penetration by the antispalling composition. Several emulsions containing oil phases prepared from mixture of tung oil, heat-bodied LSO, and boiled LSO acceptably passed the antispalling tests. Penetration of the instant curing compositions effectively prevents spalling and aggregate pop-outs for a period of up to 2 years. The same emulsions applied to cured concrete will prevent excessive spalling for a similar length of time, thereby extending the protection initialed by the curing compositions prepared according to the invention.

Antispalling properties can best be shown in the laboratory by freeze-thaw tests. For this, concrete blocks (8 × 5½ × 2 inches) were prepared as described above except that they contained ¾-inch maximum aggregate, cured by covering the wet concrete with a polyethylene sheet, and sprayed at a rate of 225 square feet per gallon 35 days after concrete preparation with the same instant emulsions used for concrete curing. An open-ended cylinder approximately 1 inch in height was sealed to one face of each concrete block forming a container having as its bottom the concrete surface. The containers were filled with a 3 percent salt solution, and the blocks were exposed to 0° F. for about 16 hours after which they were thawed at 78° F. for about 8 hours. Freeze-thaw cycles were repeated as many times as was necessary, and the blocks were visually inspected frequently for signs of spalling. Spalling rates based on a scale of 0.0 to 5.0 are defined as follows:

0.0 - Essentially no change, brush marks visible and unchanged;
1.0 - Slight deterioration of fine surface, brush marks beginning to become rounded;
2.0 - Moderate deterioration of fine surface, brush marks beginning to disappear;
3.0 - Brush marks gone, some deeper deterioration showing coarse aggregate; 5-½prepared ¾ -inch covering preparation
4.0 - Moderate deterioration of surface, coarse aggregate visible over approximately half of surface;
5.0 - Most or all surface gone, coarse aggregate visible over entire surface.

Some blocks will show more severe deterioration in one section than they will in others. In these instances, the rating will be averaged according to the deterioration severity and the size of area in question. After the surface of a block is gone, it will deteriorate more rapidly with additional freeze-thaw cycles.

Antispalling emulsions prepared according to the invention were subjected to the freeze-thaw test described above. After 30 cycles, blocks protected with emulsions prepared from oil phases containing 20 to 40 percent Z-8 LSO had ratings of 0–0.3 while those protected by emulsions containing only boiled LSO had a rating of 1.0. Blocks having no coatings had already deteriorated to the 5.0 level. After 80 cycles, roughly corresponding to two winters, blocks treated with emulsions prepared from oil phases containing from 20 to 30 percent Z-8 LSO still had ratings of about 1 while blocks treated with 40 percent Z-8 emulsions and emulsions containing only boiled LSO had ratings of over 4. Interestingly, emulsions having this same ratio of heat-bodied LSO/boiled LSO (i.e., 15/85 to 30/70) give the minimum curing water losses and the best balance between penetration of curing compositions and subsequently applied antispalling composition.

Emulsions prepared from oil phases containing mixtures of 15 to 20 percent tung oil, 0 to 5 percent Z-8 LSO, and 75 to 80 percent boiled LSO compared favorably in freeze-thaw tests with emulsions prepared from oil phases containing either 20 percent Z-8 LSO, 40 percent Z-5 LSO, or 100 percent boiled LSO.

The following specific examples are presented only to illustate the preparation and testing of my invention and should in no way limit its use. Emulsions having compositions other than those herein preferred, which are within the scope of the invention, may be necessary to conform to different types of concrete and weather conditions. The preparation of these compositions would be obvious to those skilled in the art in view of the present disclosure.

EXAMPLE 1

An oil phase was prepared by dissolving 97 parts by weight Z-8 heat-bodied LSO having an acid value of 22 with 3 parts saturated tallow alcohol at 140°. A water phase was prepared by dissolving 99.57 parts of water, 0.40 parts NaOH, and 0.03 parts dipicolinic acid at room temperature. Oil phase (25 gallons) was slowly added to an equal volume of water phase while stirring with a Cowles mixer having a 4-inch blade at 2,900 r.p.m. The resulting emulsion wash homogenized in a Manton-Gaulin two-stage homogenizer at 4,000 to 5,000 p.s.i.

A second emulsion was prepared in the same manner and proportions as described above except that boiled LSO was used instead of heat-bodied LSO.

Emulsions containing heat-bodied LSO to boiled LSO ratios of 15/85, 20/80, 25/75, 30/70, 40/60, 50/50, 75/25 (v/v) were prepared by stirring together the proper proportion of the two emulsions described above.

EXAMPLE 2

Emulsions containing M-25 heat-bodied LSO (acid value of 3) and boiled LSO in ratios of 20/80, 30/70, 40/60, and 50/50 (v/v) were prepared in accordance with Example 1.

EXAMPLE 3

Emulsions containing M-37 heat-bodied LSO and boiled LSO in ratios of 10/90, 25/75, 50/50, and 75/25 (v/v) were prepared in accordance with Example 1.

EXAMPLE 4

Emulsions containing Z-2 heat-bodied LSO and boiled LSO in ratios of 20/80, 30/70, 40/60, 50/50, and 75/25, and emulsions containing Z-5 heat-bodied LSO and boiled LSO in ratios of 40/60 and 50/50 were prepared in accordance with Example 1.

EXAMPLE 5

An oil phase was prepared by dissolving 43.5 parts by weight of M-37 heat-bodied LSO, 43.5 parts of boiled LSO, and 3 parts saturated tallow alcohol. A water phase was prepared by dissolving 99.57 parts by weight of water, 0.40 parts NaOH, and 0.03 parts dipicolinic acid. The two phases were mixed, emulsified, and homogenized as described in Example 1. The viscosity of this emulsion was 1,400 centipoises as compared to 115 centipoises for the emulsion having the same composition prepared in Example 3.

EXAMPLE 6

Emulsions containing raw tung oil and boiled LSO in ratios of 10/90, 25/75, and 50/50 and emulsions containing raw tung oil, Z-8 heat-bodied LSO, and boiled LSO in ratios of 10/10/80, 15/5/80, 15/10/75. 20/5/75, 10/18/72, 15/15/70, 20/10/70, 25/5/70, and 25/15/60 were prepared in accordance with Example 1.

EXAMPLE 7

Laboratory curing tests were performed on concrete blocks as described in the specification (supra) using the emulsions prepared as in Example 1 which contained oil mixtures having 0/100, 20/80, 30/70, 40/60, 50/50, 75/25, and 100/0 Z-8 heat-bodied/boiled LSO ratios. Both water loss (determined by weight loss) and penetration of curing compounds were measured. Duplicate blocks cured in the same manner were coated at a rate of 225 square feet per gallon with a 1/1 boiled LSO/mineral spirits antispalling composition 30 days after concrete preparation. At 35 days the blocks were broken and penetration measured, Table 2.

Table 2

| % Z-8 LSO in oil phase | Water loss, mg./cm.$^2$/72 hr. | Penetration, mm. | |
|---|---|---|---|
| | | Curing composition | Antispalling composition |
| 100 | 36 | 0.2 | 0.2 |
| 75 | 34 | 0.2 | 0.2 |
| 50 | 28 | 0.2 | 0.2 |
| 40 | 29 | 0.4 | 2.0 |
| 30 | 28 | 0.6 | 2.2 |
| 20 | 40 | 1.0 | 3.0 |
| 0 | 60 | 2.0 | 3.0 |
| air cured | 170 | ... | 2.0 |
| polyethylene sheet cured | 12 | ... | 3.0 |

EXAMPLE 8

Water loss tests were carried out according to ASTM Standard Method C156-65 entitled, "Water Retention Efficiency of Liquid Membrane-forming Compounds and Impermeable Sheet Materials for Curing Concrete." The results of tests with emulsions prepared as in Example 1 at a rate 175 square feet per gallon were compared to ASTM Standard C309-58 for "Liquid Membrane-Forming Compounds for Curing Concrete," Table 3.

Table 3

| Test | % Z-8 LSO in oil phase | | | | | ASTM Standard specification C309-58 |
|---|---|---|---|---|---|---|
| | 0 | 15 | 25 | 40 | 100 | |
| Composition | Good | Good | Good | Good | Good | When sprayed at the specified rate, it shall be readily distinguishable upon the concrete surface for at least 4 hours after application. |

Table 3 — Continued

| Test | % Z-8 LSO in oil phase | | | | | ASTM Standard specification C309-58 |
|---|---|---|---|---|---|---|
| | 0 | 15 | 25 | 40 | 100 | |
| Character of film | Good | Good | Good | Good | Good | The compound shall adhere to damp concrete and shall form a continuous coherent film when applied at the specified rate of application. |
| Consistency | Good | Good | Good | Good | Good | When sprayed on the vertical face of a damp concrete block, it shall not run or sag. |
| Drying time (hr.) | 2:10 | 3:05 | 6:30 | 4:50 | 2:35 | Maximum 4 hours. |
| Moisture retention Application rate (sq. ft./gal.) | 175 | 175 | 175 | 175 | 175 | |
| Water loss (g./sq. cm.) | 0.040 | 0.013 | 0.014 | 0.015 | 0.071 | Max. 0.055 g./sq. cm. |

The above test was repeated using an application rate of 200 square feet per gallon, Table 4.

Table 4

| Test | % Z-8 LSO in oil phase | | | | | ASTM Standard specification C309-58 |
|---|---|---|---|---|---|---|
| | 0 | 15 | 25 | 40 | 100 | |
| Composition | Good | Good | Good | Good | Good | When sprayed at the specified rate, it shall be readily distinguishable upon the concrete surface for at least 4 hours after application. |
| Character of film | Good | Good | Good | Good | Good | The compound shall adhere to damp concrete and shall form a continuous coherent film when applied at the specified rate of application. |
| Consistency | Good | Good | Good | Good | Good | When sprayed on the vertical face of a damp concrete block, it shall not run or sag. |
| Drying time (hr.) | 1:25 | 2:10 | 4:45 | 2:50 | 1:05 | Maximum 4 hours. |
| Moisture retention Application rate (sq. ft./gal.) | 200 | 200 | 200 | 200 | 200 | |
| Water loss (g./sq. cm.) | 0.045 | 0.018 | 0.016 | 0.022 | 0.078 | Max. 0.055 g./sq. cm. |

EXAMPLE 9

Water loss tests were carried out as described in Example 8 on the emulsion prepared in accordance with Example 1 and containing, in addition, 0, 3, or 5 percent $TiO_2$ pigment, Table 5.

Table 5

| % Z-8 LSO in oil phase | $TiO_2$ pigment, % | Application rate, yd.²/gal. | Water loss, mg./cm.²/ 72 hr. | Drying time, hr. |
|---|---|---|---|---|
| 0 | 0 | 200 | 34 | 3:40 |
| 10 | 0 | 200 | 26 | 3:05 |
| 20 | 0 | 200 | 12 | 3:05 |
| 0 | 3 | 200 | 60 | 4:40 |
| 0 | 3 | 175 | 42 | ... |
| 10 | 3 | 200 | 52 | 4:25 |

Table 5 — Continued

| % Z-8 LSO in oil phase | $TiO_2$ pigment, % | Application rate, yd.²/gal. | Water loss, mg./cm.²/ 72 hr. | Drying time, hr. |
|---|---|---|---|---|
| 10 | 3 | 175 | 29 | ... |
| 20 | 3 | 200 | 23 | 4:15 |
| 20 | 3 | 175 | 13 | ... |
| 0 | 5 | 200 | 45 | 3:50 |
| 10 | 5 | 200 | 29 | 3:35 |
| 20 | 5 | 200 | 15 | 3:30 |

EXAMPLE 10

Emulsions prepared as in Example 2 were tested for concrete-curing properties, Table 6, in the same manner as described in Example 7.

Table 6

| % M-25 LSO in oil phase | Water loss, mg./cm.²/72 hr. | Penetration, mm., curing composition |
| --- | --- | --- |
| 100 | 48 | 0.2 |
| 50 | 54 | 0.3 |
| 40 | 65 | 0.5 |
| 30 | 85 | 1.0 |
| 20 | 86 | 1.5 |
| 0 | 98 | 2.0 |
| air cured | 179 | ... |
| polyethylene sheet cured | 6 | ... |

EXAMPLE 11

Emulsions prepared as in Examples 3 and 5 which have oil phases of 50/50 M-37 LSO and boiled LSO were tested for concrete-curing properties, Table 7, in the same manner as described in Example 7.

Table 7

| % M-37 LSO in oil phase | Water loss, mg./cm.²/72 hr. | Penetration, mm. Curing composition | Penetration, mm. Antispalling composition |
| --- | --- | --- | --- |
| 50 (Ex. 3) | 30 | 0.3 | 0.4 |
| 50 (Ex. 5) | 30 | 0.3 | 0.4 |
| 0 | 80 | 2.0 | 3.0 |
| air cured polyethylene sheet cured | 136 | ... | 3.5 |
| commercial curing agent | 7 | ... | 2.5 |
|  | 22 | 0.0 | 2.5 |

The tests were repeated with emulsions prepared as in Example 3, Table 8.

Table 8

| % M-37 LSO in oil phase | Water loss, mg./cm.²/72 hr. | Penetration, mm. Curing composition | Penetration, mm. Antispalling composition |
| --- | --- | --- | --- |
| 100 | 30 | 0.2 | 0.2 |
| 75 | 31 | 0.2 | 0.2 |
| 50 | 25 | 0.2 | 0.2 |
| 25 | 56 | 1.0 | 3.5 |
| 10 | 82 | 2.0 | 3.5 |
| 0 | 82 | 2.8 | ... |
| air cured | 164 | ... | 2.5 |
| polyethylene sheet cured | 12 | ... | 2.5 |

EXAMPLE 12

Emulsions prepared as in Example 4 were tested for concrete-curing properties, Table 9, in the same manner as described in Example 7.

Table 9

| % Z-2 LSO in oil phase | Water loss, mg./cm.²/72 hr. | Penetration, mm. Curing composition | Penetration, mm. Antispalling composition |
| --- | --- | --- | --- |
| 100 | 30 | 1.0 | 1.5 |
| 75 | 50 | 1.2 | 3.0 |
| 50 | 51 | 1.5 | 3.5 |
| 40 | 46 | 1.5 | 3.5 |
| 30 | 43 | 1.6 | 3.0 |
| 20 | 58 | 2.0 | 2.5 |
| 0 | 62 | 2.0 | ... |
| air cured | 162 | ... | 2.0 |
| polyethylene sheet cured | 15 | ... | 2.0 |

EXAMPLE 13

Water loss tests were carried out as described in Example 8 on emulsions prepared according to Examples 1, 4, and 6 and containing, in addition, 5 percent $TiO_2$ pigment (see Table 10 for results).

Table 10

| Test | 40% Z-5 LSO | 20% Tung oil | 20% Z-8 LSO | ASTM Standard specification C309-71 |
| --- | --- | --- | --- | --- |
| Composition | Excellent | Satisfactory | Satisfactory | When sprayed at the specified rate, it shall be readily distinguishable upon the concrete surface for at least 4 hours after application. |
| Character of film | Excellent | Satisfactory | Satisfactory | The compound shall adhere to damp concrete and shall form a continuous coherent film when applied at the specified rate of application. |
| Consistency | Excellent | Satisfactory | Satisfactory | When sprayed on the vertical face of a damp concrete block, it shall not run or sag. |
| Drying time | Over 6 hr. | 5 hr. 50 min. | Over 6 hr. | Maximum 4 hours. |
| Moisture retention Application rate (sq. ft./gal.) | 200 | 200 | 200 |  |
| Water loss (g./sq. cm.) | 0.029 | 0.042 | 0.045 | Max. 0.055 g./sq. cm. |

Table 11

| Composition of oil phase, % | | | Water loss, mg./cm.²/72 hr. | Penetration, mm. | |
|---|---|---|---|---|---|
| Tung | Z-8 LSO | Boiled LSO | | Curing composition | Antispalling composition |
| 100 | 0 | 0 | 47 | 0.5 | 0.5 |
| 50 | 0 | 50 | 45 | 0.8 | 0.5 |
| 25 | 0 | 75 | 44 | 1.0 | 1.0 |
| 10 | 0 | 90 | 71 | 1.5 | 2.5 |
| 25 | 15 | 60 | 23 | 0.5 | 0.5 |
| 10 | 18 | 72 | 28 | 0.5 | 0.8 |
| 0 | 40 (Z-5) | 60 | 33 | 1.0 | 1.5 |
| 0 | 0 | 100 | 115 | 2.0 | 3.5 |
| air cured | | | 318 | ... | 3.0 |

Table 12

| Composition of oil phase, % | | | Water loss, mg./cm.²/72 hr. | Penetration, mm. | |
|---|---|---|---|---|---|
| Tung | Z-8 LSO | Boiled LSO | | Curing composition | Antispalling composition |
| 15 | 5 | 80 | 55 | 1.0 | 1.5 |
| 10 | 10 | 80 | 89 | 1.0 | 1.5 |
| 20 | 5 | 75 | 32 | 1.0 | 1.0 |
| 15 | 10 | 75 | 63 | 0.8 | 0.8 |
| 25 | 5 | 70 | 43 | 0.6 | 0.6 |
| 20 | 10 | 70 | 53 | 0.5 | 0.5 |
| 15 | 15 | 70 | 36 | 0.5 | 0.5 |
| 0 | 0 | 100 | 130 | 2.0 | 3.0 |
| air cured | | | 296 | ... | 2.0 |

EXAMPLE 14

Emulsions prepared as in Examples 4 and 6 were tested for concrete-curing properties, Table 11, in the same manner as described in Example 7.

EXAMPLE 15

Emulsions prepared as in Example 6 were tested for concrete-curing properties, Table 12, in the same manner as described in Example 7.

EXAMPLE 16

Emulsions prepared as in Example 1 having Z-8 LSO/boiled LSO ratios of 0/100, 20/80, 30/70, and 40/60 were tested for antispalling properties. The freeze-thaw testing method and visual spalling rating is described in the specification (supra) and reported in Table 13.

Table 13

| % Z-8 LSO in oil phase | Freeze-thaw cycles | | | |
|---|---|---|---|---|
| | 19 | 30 | 40 | 80 |
| 40 | 0.0 | 0.3 | 1.7 | 4.1 |
| 30 | 0.0 | 0.0 | 0.8 | 1.3 |
| 20 | 0.0 | 0.0 | 0.0 | 0.6 |
| 0 | 0.0 | 1.0 | 3.2 | 4.2 |
| no coating | 4.3 | 5.0 | 5.0 | ... |

EXAMPLE 17

Emulsions prepared as in Examples 1, 4, and 6 were tested as described in Example 16 and reported in Table 14.

Table 14

| Composition of oil phase, % | | | Freeze-thaw cycles | | | | |
|---|---|---|---|---|---|---|---|
| Tung | Z-8 LSO | Boiled LSO | 0 | 10 | 20 | 25 | 55 |
| 25 | 0 | 75 | 0.0 | 0.1 | 2.8 | 4.0 | 4.3 |
| 20 | 5 | 75 | 0.0 | 0.2 | 2.2 | 3.5 | 4.6 |
| 15 | 5 | 80 | 0.0 | 0.0 | 1.5 | 4.0 | 4.6 |
| 0 | 20 | 80 | 0.0 | 0.1 | 2.8 | 4.0 | 4.3 |
| 0 | 40 (Z-5) | 60 | 0.0 | 0.0 | 3.1 | 4.2 | 4.7 |
| 0 | 0 | 100 | 0.0 | 0.1 | 2.8 | 4.5 | 4.7 |

I claim:

1. In a dual-purpose concrete-cure and antispalling composition of the aqueous emulsion type which normally contains a boiled linseed oil (LSO) oil phase, emulsifiers, and stabilizers, an improvement which comprises an aqueous emulsion in which the ratio of oil phase to water phase is from 55/45 to 45/55 1 volume/volume, and said oil phase contains from 50 to 90 volume percent boiled LSO and from 10 to 50 volume percent of a composition selected from the group consisting of heat-bodied LSO, having a Gardner-Holdt viscosity of from Z-2 to M-37, an acid number from 3 to 22, a saponification number from 187 to 194, and an iodine number from 115 to 175; raw tung oil having a Brookfield viscosity of 950 centipoises; and mixtures of the same.

2. The improved dual-purpose concrete-cure and antispalling composition as described in claim 1 which comprises the following components:

| Component | | Weight % |
|---|---|---|
| a. | oil phase | 43-53 |
| b. | saturated tallow alcohol | 0.5-1.5 |
| c. | dipicolinic acid | 0.005-0.015 |
| d. | alkali | 0.1-0.3 |
| e. | water | remainder. |

3. The improved dual-purpose concrete-cure and antispalling composition as described in claim 2 in which the oil phase contains from 15 to 30 volume percent heat-bodied LSO having a Gardner-Holdt viscosity of from Z-2 to M-37, an acid number from 3 to 22, a saponification number from 187 to 194, and an iodine number from 115 to 175.

4. The improved dual-purpose concrete-cure and antispalling composition as described in claim 3 in which the heat-bodied LSO has a Gardner-Holdt viscosity of from Z-5 to M-37.

5. The improved dual-purpose concrete-cure and antispalling composition as described in claim 2 in which the oil phase contains from 10 to 25 volume percent raw tung oil.

6. A water-extendable nonaqueous composition, which can be readily emulsified with water to form an improved dual-purpose concrete-cure and antispalling composition, comprising the following components:

| Component | | Weight % |
|---|---|---|
| a. | an oil phase containing from 50 to 90 volume percent boiled LSO and from 10 to 50 volume percent of a composition selected from the group consisting of heat-bodied LSO having a Gardner-Holdt viscosity of from Z-2 to M-37, an acid number from 3 to 22, a saponification number from 187 to 194, and an iodine number from 115 to 175; raw tung oil having a Brookfield viscosity of 950 centipoises; and mixtures of the same | 94-95 |
| b. | saturated tallow alcohol | 1-3 |
| c. | dipicolinic acid | 0.01-0.03 |
| d. | alkali | 0.2-0.6 |
| e. | a 2/1 mixture of 4-methoxy-4-methylpentanol-2 and ethylene glycol. | 1-2 |

7. A water-extendable nonaqueous composition as described in claim 6 in which the oil phase contains from 15 to 20 volume percent heat-bodied LSO having a Gardner-Holdt viscosity of from Z-2 to M-37, an acid number from 3 to 22, a saponification number from 187 to 194, and an iodine number from 115 to 175.

8. A water-extendable nonaqueous composition as described in claim 6 in which the oil phase contains from 10 to 25 volume percent raw tung oil.

9. A water-extendable nonaqueous composition as described in claim 7 in which the heat-bodied LSO has a Gardner-Holdt viscosity of from Z-5 to M-37.

* * * * *